US 8,882,602 B2

(12) United States Patent
Line et al.

(10) Patent No.: US 8,882,602 B2
(45) Date of Patent: Nov. 11, 2014

(54) SLIP YOKE ASSEMBLY

(71) Applicant: Dana Automotive Systems Group, LLC, Maumee, OH (US)

(72) Inventors: Joshua D. Line, McComb, OH (US); DaWuan A. Smith, Sylvania, OH (US)

(73) Assignee: Dana Automotive Systems Group, LLC, Maumee, OH (US)

( * ) Notice: Subject to any disclaimer, the term of this patent is extended or adjusted under 35 U.S.C. 154(b) by 0 days.

(21) Appl. No.: 13/790,327

(22) Filed: Mar. 8, 2013

(65) Prior Publication Data

US 2014/0256456 A1 Sep. 11, 2014

(51) Int. Cl.
*F16D 3/06* (2006.01)
*F16D 3/16* (2006.01)
*F16C 3/03* (2006.01)
*F16D 3/84* (2006.01)

(52) U.S. Cl.
CPC ... *F16D 3/16* (2013.01); *F16C 3/03* (2013.01); *F16D 3/843* (2013.01); *F16D 3/06* (2013.01)
USPC ............ 464/133; 464/134; 464/162; 277/637

(58) Field of Classification Search
CPC ............. F16C 3/03; F16D 3/06; F16D 3/382; F16D 3/84; F16D 3/843; F16J 15/021; F16J 15/06; F16J 15/061; F16J 15/062; F16J 15/10; F16J 15/12
USPC .......... 464/133–135, 162, 182; 277/609, 616, 277/630, 637
See application file for complete search history.

(56) References Cited

U.S. PATENT DOCUMENTS

| | | | |
|---|---|---|---|
| 1,058,210 | A | 4/1913 | Welch |
| 1,730,377 | A | 10/1929 | Northrup |
| 1,801,006 | A | 4/1931 | Jacoby |
| 2,078,212 | A | 4/1937 | Leighton |
| 2,630,939 | A * | 3/1953 | Jones |
| 2,665,818 | A | 1/1954 | Borges et al. |
| 2,687,228 | A | 8/1954 | Knocke |
| 3,400,558 | A | 9/1968 | Haines |
| 3,467,271 | A | 9/1969 | Kaiser et al. |
| 3,497,906 | A | 3/1970 | McFadden |

(Continued)

FOREIGN PATENT DOCUMENTS

FR 2660378 A1 10/1991

OTHER PUBLICATIONS

"Contiguous." Dictionary.com. [online], [retrieved on Jul. 16, 2014]. Retrieved from the Internet <URL: http://dictionary.reference.com/browse/contiguous>.*

Primary Examiner — Gregory Binda
Assistant Examiner — Josh Skroupa
(74) Attorney, Agent, or Firm — Marshall & Melhorn, LLC

(57) ABSTRACT

A slip yoke assembly including a slip yoke having a long bore extending between a first end and a second end and a counterbore at the second end of the long bore. The counterbore has a first wall which defines a first diameter which is greater than a major diameter of the long bore. An annular groove is positioned between the long bore and the first diameter. A sealing member is disposed within the annular groove. The slip yoke assembly also includes a plug disposed within the counterbore and over the sealing member. The plug is secured to the slip yoke by a lip formed over the plug.

20 Claims, 7 Drawing Sheets

(56) References Cited

U.S. PATENT DOCUMENTS

| | | | |
|---|---|---|---|
| RE27,068 E | 2/1971 | Groves | |
| 3,881,324 A | 5/1975 | Girguis | |
| 3,908,684 A * | 9/1975 | Short | |
| 3,958,411 A | 5/1976 | Bernt | |
| 4,049,151 A | 9/1977 | Schweiso | |
| 4,126,758 A | 11/1978 | Krumme | |
| 4,147,041 A | 4/1979 | Girguis | |
| 4,364,614 A | 12/1982 | Weis | |
| 4,379,707 A | 4/1983 | Fisher | |
| 4,475,737 A | 10/1984 | Cook | |
| 4,478,531 A | 10/1984 | Levinson et al. | |
| 5,309,875 A | 5/1994 | Gault | |
| 5,352,026 A | 10/1994 | Snook | |
| 5,425,585 A | 6/1995 | Hoffmann | |
| 5,562,546 A | 10/1996 | Koslowski et al. | |
| 5,579,661 A | 12/1996 | Yarnell | |
| 5,716,276 A | 2/1998 | Mangas | |
| 5,735,747 A | 4/1998 | Gehrke | |
| 5,836,823 A | 11/1998 | Shellaberger | |
| 6,125,541 A | 10/2000 | Parker | |
| 6,183,370 B1 * | 2/2001 | Lim | 464/162 |
| 6,202,280 B1 | 3/2001 | Parker | |
| 6,243,937 B1 | 6/2001 | Craig et al. | |
| 6,247,702 B1 | 6/2001 | Long | |
| 6,261,183 B1 | 7/2001 | Duggan | |
| 6,348,002 B1 | 2/2002 | Breese | |
| 6,368,242 B1 | 4/2002 | Irwin | |
| 6,394,139 B1 | 5/2002 | Mitchell | |
| 6,446,939 B1 | 9/2002 | Hoppe | |
| 6,475,093 B1 | 11/2002 | Keyes | |
| 6,585,235 B2 | 7/2003 | Pattullo | |
| 6,619,873 B2 | 9/2003 | Parker | |
| 6,840,865 B2 | 1/2005 | Lentini | |
| 6,962,347 B2 * | 11/2005 | Smith, III | 277/637 X |
| 7,090,584 B2 | 8/2006 | Wang | |
| 7,097,563 B2 | 8/2006 | Benson | |
| 7,115,037 B2 | 10/2006 | Schlegelmann | |
| 7,226,360 B2 | 6/2007 | Lyon et al. | |
| 7,516,838 B2 | 4/2009 | Dutschke | |
| 8,092,312 B2 | 1/2012 | Duncan | |
| 2005/0054454 A1 | 3/2005 | Kurzeja | |
| 2009/0114401 A1 | 5/2009 | Purkis | |
| 2011/0005839 A1 | 1/2011 | Marchand | |
| 2011/0215533 A1 | 9/2011 | Li | |

* cited by examiner

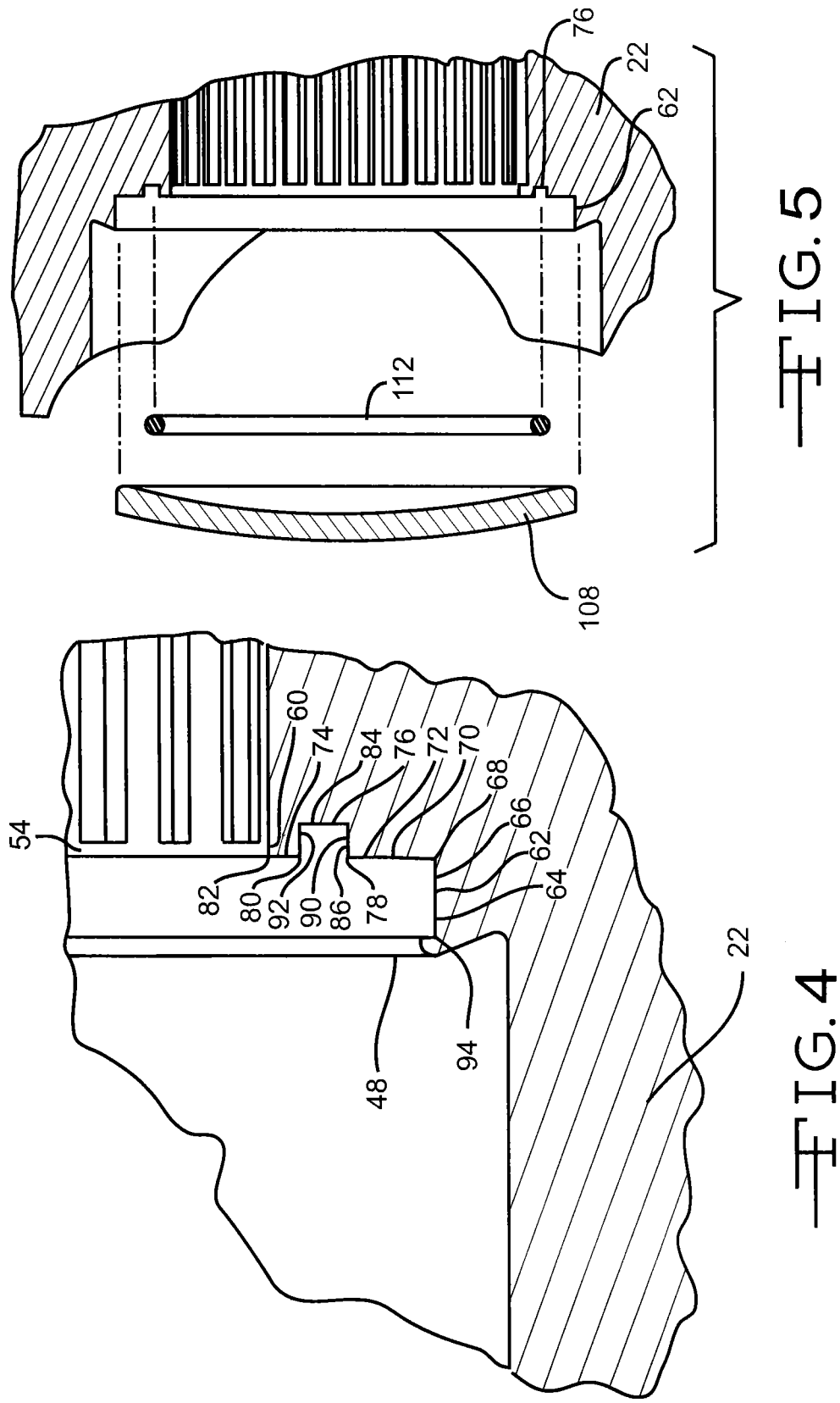

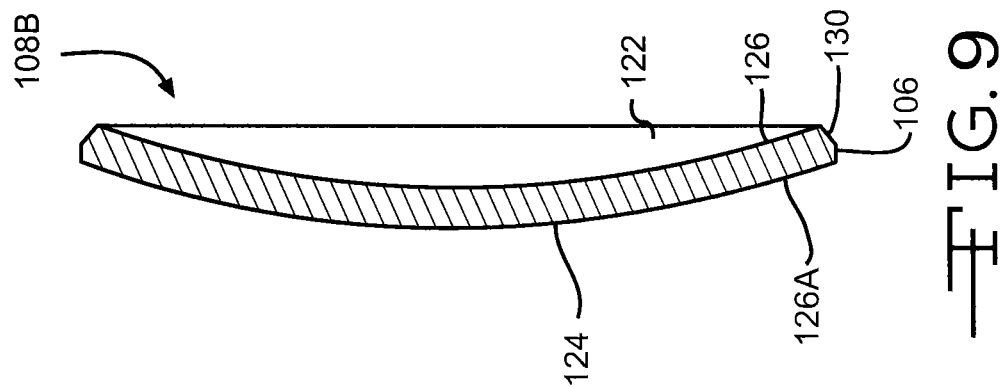
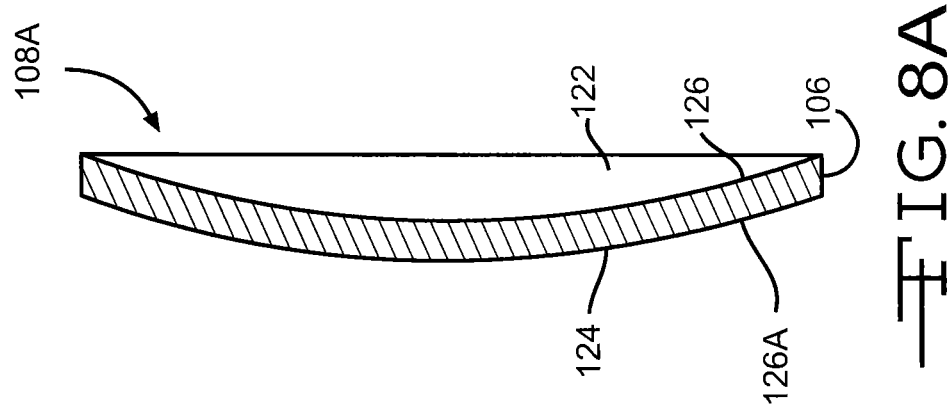
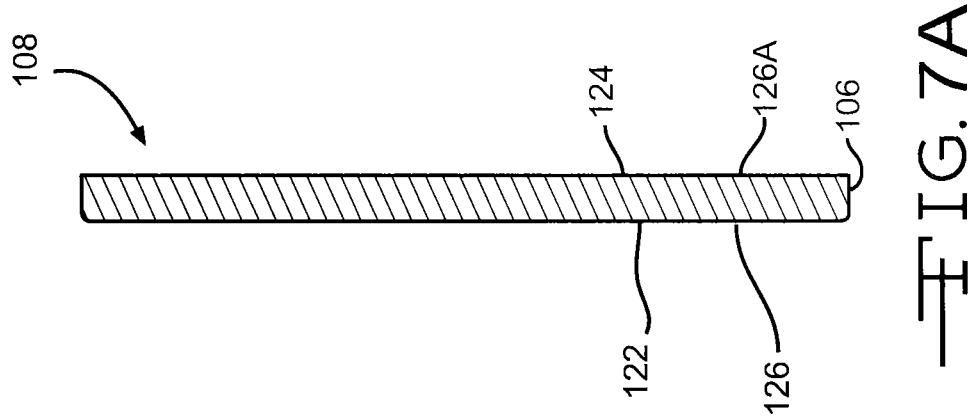

US 8,882,602 B2

SLIP YOKE ASSEMBLY

BACKGROUND OF INVENTION

This invention relates in general to universal joints. In particular, this invention relates to a slip yoke assembly for use with a universal joint in a vehicle driveshaft assembly.

Slip yoke assemblies are used to transmit torque. Typical slip yoke assemblies include a slip yoke having internal splines which interconnect with splines on a transmission output shaft, transfer case output shaft or driveshaft. Lubricant such as grease, oil, transmission fluid or the like is used to tolerate axial translation between the shaft and the slip yoke when they are connected.

An end of the slip yoke is closed to retain or seal the lubricant and prevent dust and other contaminants from entering. Preferably, a fluid tight closure is provided. However, slip yoke assemblies are typically required to perform over an extended period of time, under heavy torque loads. Thus, lubricant leakage from or contaminants entering the end of the slip yoke assembly is common in the known assemblies. Both lubricant leakage and entering contaminants shorten the efficient life of the slip yoke assembly which is undesirable.

Therefore, it would be desirable to provide an improved slip yoke assembly which offers significant improvements in lubricant leakage from and preventing contaminants from entering an end of the assembly.

BRIEF SUMMARY OF THE INVENTION

In an embodiment, a slip yoke assembly is provided. The slip yoke assembly comprises a slip yoke having a long bore extending between a first end and a second end and a counterbore at the second end of the long bore. The counterbore has a first wall which defines a first diameter which is greater than a major diameter of the long bore. An annular groove is positioned between the long bore and the first diameter. A sealing member is disposed within the annular groove. The slip yoke assembly also comprises a plug disposed within the counterbore and over the sealing member. The plug is secured to the slip yoke by a lip formed over the plug.

In another embodiment, the slip yoke assembly comprises a slip yoke having a long bore extending between a first end and a second end and a counterbore at the second end of the long bore. The counterbore has a first wall which defines a first diameter which is greater than a major diameter of the long bore. An annular groove is provided in a seal surface of the slip yoke and positioned between the long bore and the first wall. The annular groove comprises an end surface, an axially extending inner wall and an axially extending outer wall. The axially extending inner wall and axially extending outer wall are each attached to a portion of the seal surface. The slip yoke assembly also comprises a sealing member. The seal member comprises an inner diameter and an outer diameter. The seal member is disposed within the annular groove over the end surface and between the axially extending inner wall and outer wall. A plug is disposed within the counterbore over the sealing member. The plug is secured to the slip yoke by a contiguous annular lip formed over an outer edge portion of the plug to provide a fluid tight seal at the second end of the slip yoke.

BRIEF DESCRIPTION OF THE SEVERAL VIEWS OF THE DRAWING

The above, as well as other advantages of the present invention will become readily apparent to those skilled in the art from the following detailed description when considered in the light of the accompanying drawings in which:

FIG. 4 is a partial cross-sectional view of a portion of a slip yoke suitable for use in the slip yoke assembly;

FIG. 5 is an exploded cross-sectional view of portions of a slip yoke assembly in accordance with the invention;

FIG. 7A is a cross-sectional view of the plug of FIG. 7;

FIG. 8A is a cross-sectional view of the plug of FIG. 8; and

FIG. 9 is a cross-sectional view of an embodiment of a plug suitable for use in the slip yoke assembly.

DETAILED DESCRIPTION OF THE INVENTION

Figure 1:
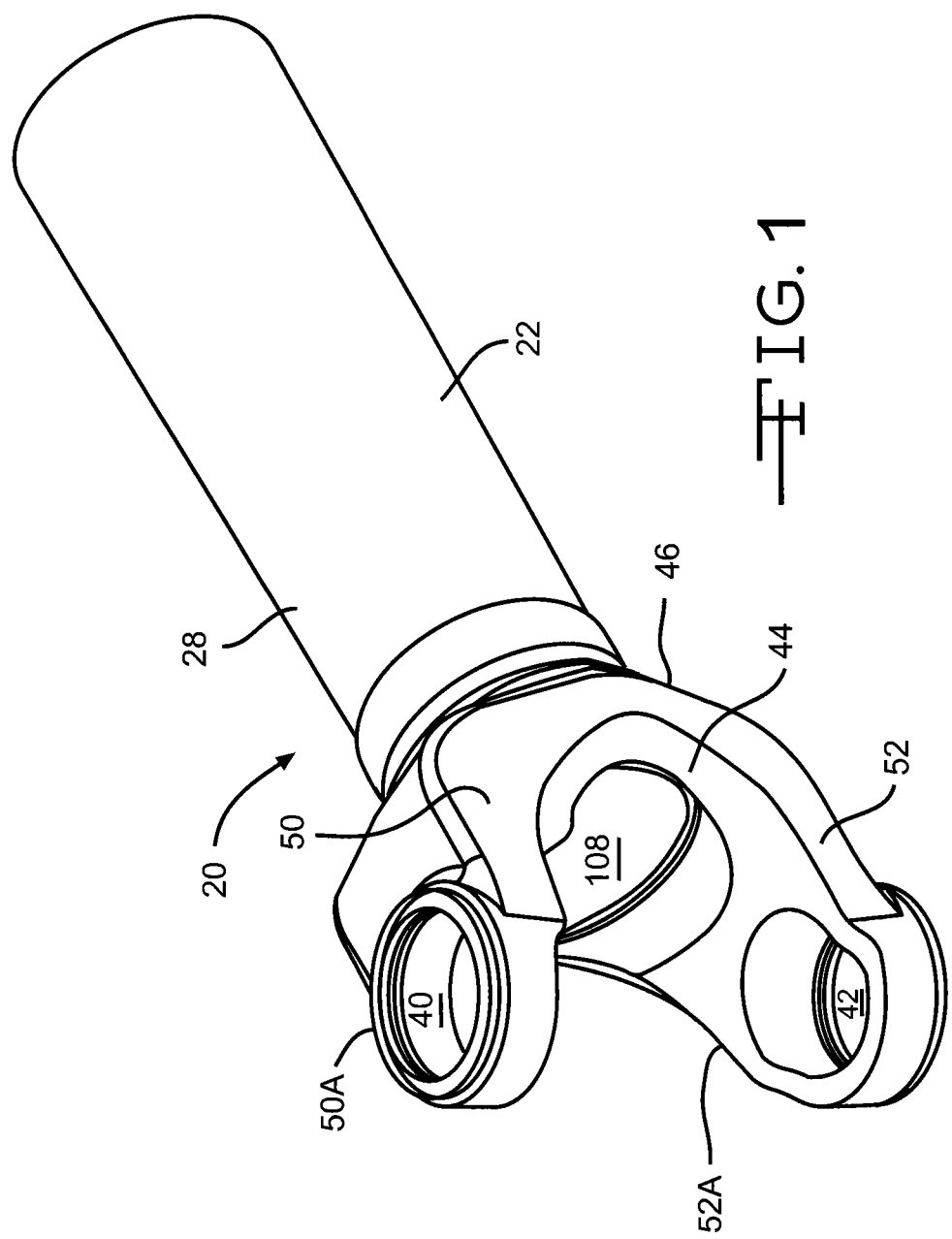
FIG. 1 is a perspective view showing an embodiment of a slip yoke assembly in accordance with the invention.

It is to be understood that the invention may assume various alternative orientations and step sequences, except where expressly specified to the contrary. It is also to be understood that the specific assemblies and features illustrated in the attached drawings, and described in the following specification are simply exemplary embodiments of the inventive concepts. Hence, specific dimensions, directions, or other physical characteristics relating to the embodiments disclosed are not to be considered as limiting, unless expressly stated otherwise. Also, although they may not be, like elements in various embodiments may be commonly referred to with like reference numerals within this section of the application.

A slip yoke assembly is provided. The slip yoke assembly will be described in connection with a universal joint for a vehicle. It would be understood by one of ordinary skill in the art that the various embodiments of the slip yoke assembly described herein may have applications to on-highway or off-highway vehicles. Furthermore, it would be understood by one of ordinary skill in the art that these embodiments could have industrial, locomotive, and aerospace applications.

Figure 2:
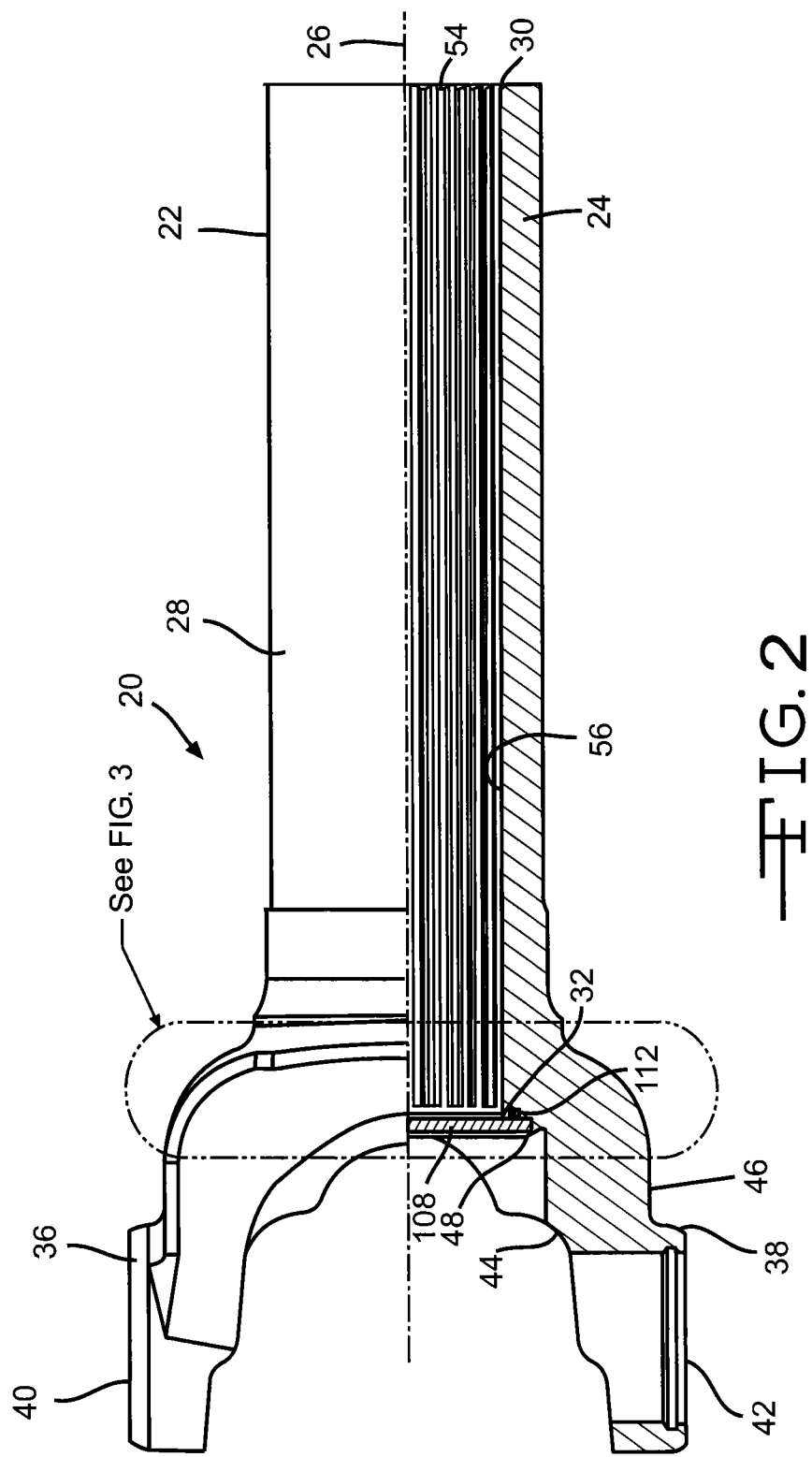
FIG. 2 is a partial cross-sectional view of the slip yoke assembly of FIG. 1.
Figure 3:
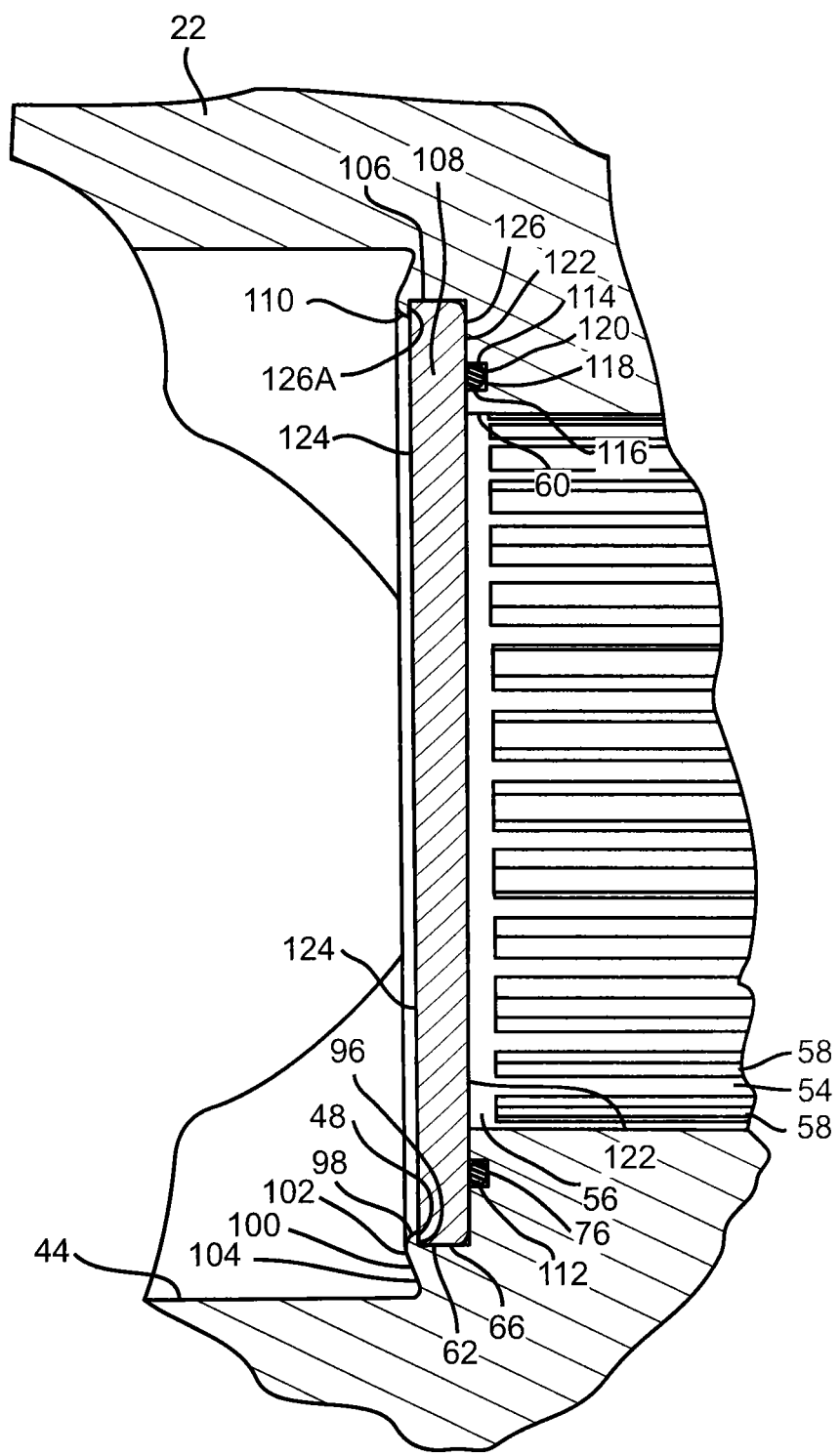
FIG. 3 is an enlarged cross-sectional view of a portion of the slip yoke assembly of FIG. 2.

Referring now to the drawings, there is illustrated in FIGS. 1-3 an embodiment of a slip yoke assembly 20 which hereinafter may also be referred to as the "assembly."

As depicted, the slip yoke assembly 20 comprises a slip yoke 22. The slip yoke 22 is preferably formed from a metallic material such as steel and iron. The slip yoke 22 includes a hollow cylindrical body 24 and is rotatable about a longitudinal axis 26. The body 24 includes an outer cylindrical surface 28, a first end 30, and a second end 32.

The slip yoke 22 also includes a pair of opposed lug ears 36, 38. Each lug ear 36, 38 is attached to the body 24 and extends in a generally axial direction from the body 24. Each lug ear 36, 38 has a generally cylindrical opening 40, 42 formed there through. The openings 40, 42 are coaxial with one another.

Each lug ear 36, 38 includes an inner surface 44 and an outer surface 46. The inner surface 44 extends from each opening 40, 42 to a lip 48. The outer surface 46 extends from an opposite end of each opening 40, 42 to the body 24. Each lug ear 36, 38 includes a pair of side surfaces 50, 50A, 52, 52A between the inner surface 44 and the outer surface 46.

As shown best in FIGS. 2-3, the slip yoke 22 comprises a long bore 54 extending through the body 24. The long bore 54 extends between the first end 30 and the second end 32. The long bore 54 defines an inner surface 56 of the body 24. The long bore 54 has a major diameter 60 defined by the inner surface 56 that is of a radial length. The long bore 54 is splined and has a plurality of splined teeth 58 formed thereon. The teeth 58 extend longitudinally and the length of the long bore 54. The teeth 58 also extend radially inward.

The long bore receives and interconnects with a splined end portion (not depicted) of a driveshaft (not depicted) or another attaching member (not depicted). The splined end portion extends through the long bore 54 and ends adjacent the second end 32. The splined end portion can slide axially relative to the long bore 54 under certain conditions.

The slip yoke 22 has a counterbore 62 at the second end 32 of the long bore 54. The counterbore 62 comprises a first diameter 64. The first diameter 64 is located radially about the longitudinal axis 26 of the slip yoke 22. The first diameter 64 is of a length which is greater than that of the major diameter 60 of the long bore 54.

As best illustrated in FIG. 4, where portions of the assembly 20 have been removed for the purpose of describing features of the slip yoke 22, the first diameter 64 is defined by a first wall 66. On an end 68, the first wall 66 is attached to a seal surface 70. The seal surface 70 extends radially inward from the first wall 66 and separates the first wall 66 from the long bore 54.

The seal surface 70 comprises an outer portion 72 and an inner portion 74. The outer portion 72 and inner portion 74 extend radially. The outer portion 72 is attached to the first wall 66 and an annular groove 76 on an opposite end 78. The inner portion 74 is attached to the annular groove 76 on an end 80 and inner surface 56 of the long bore 54 on an opposite end 82. In an embodiment, the outer portion 72 is of a length which is greater than that of the inner portion 74.

Preferably, the annular groove 76 is provided in the seal surface 70. In an embodiment, the annular groove 76 is positioned between the long bore 54 and the first wall 66 and is separated from the long bore 54 and the first wall 66 by the inner portion 74 and outer portion 72 of the seal surface 70. The annular groove 76 extends axially from an end surface 84 to the seal surface 70. As illustrated, the first wall 66 may be of a thickness which is greater than a thickness of the annular groove 76.

The annular groove 76 comprises the end surface 84, an outer wall 86 and an inner wall 88. In an embodiment, the end surface 84 is annular. The outer wall 86 and the inner wall 88 are provided on opposite sides of the end surface 84 and each extend axially from the end surface to the seal surface. Preferably, the outer wall 86 and the inner wall 88 are of thicknesses which are equal or substantially equal to each other.

The annular groove 76 is positioned relative to the long bore 54 and the first wall 66, preferably, between the long bore 54 and the first wall 66. In an embodiment, the outer wall 86 defines an outer diameter 90 and the inner wall 88 defines an inner diameter 92 of the annular groove 76. The outer diameter 90 and the inner diameter 92 of the annular groove 76 are each of lengths which are less than that of the first diameter 64 of the counterbore 62 and are greater than that of the major diameter 60 of the long bore 54.

On an opposite end 94, the first wall 66 is attached to the lip 48. Referring back to FIG. 3, the lip 48 is formed over an outer edge 106 of a plug 108, 108A, 108B. The lip 48 comprises a radial surface 96, an outer surface 98 and an inclined surface 100. The outer surface 98 is attached to an end 102 of the inclined surface 100. On an opposite end 104, the inclined surface 100 is attached to the inner surface 44 of the lug ears 36, 38. The outer surface 98 is also attached to the radial surface 96.

Preferably, the lip 48 is annular. In an embodiment, the lip 48 is contiguous. In this embodiment, the lip 48 defines a diameter 110 which is of a length that is greater than that of the diameters 90, 92 of the annular groove 76 but less than that of the first diameter 64. Preferably, the lip 48 is formed by a staking.

A sealing member 112 is disposed within the annular groove 76. Preferably, the sealing member 112 is formed from a rubber material or the like. Suitable rubber materials for use in forming the sealing member 112 are polyacrylate, ethylene acrylate, nitrile, and ethylene acrylic rubber and blends thereof. However, in other embodiments, the sealing member is not limited to a rubber material or the like and may be formed from other materials.

Preferably, the sealing member 112 comprises an outer diameter 114 and an inner diameter 116. The inner diameter 116 is defined by an inner surface portion 118 and the outer diameter 114 is defined by an outer surface portion 120. In an embodiment, the sealing member 112 is ring-shaped. In this embodiment, the inner diameter 116 defines an aperture which extends through the sealing member 112. Preferably, the sealing member 112 is an O-ring.

The sealing member 112 is disposed within the annular groove 76 such that it is positioned about the inner wall 88. In an embodiment, the inner surface portion 118 is positioned adjacent the inner wall 88 and the outer surface portion 120 is positioned adjacent the outer wall 86 of the groove 76. Preferably, the sealing member 112 is of a thickness which, prior to forming the slip yoke assembly 20, is greater than the thickness of the inner wall 88 and outer wall 86. The thickness of the sealing member can be selected to allow the sealing member 112 to be compressed and to provide a preferred compression for the sealing member 112 when the assembly 20 is formed.

The slip yoke assembly 20 comprises the plug 108, 108A, 108B. The plug 108, 108A, 108B is disposed within the counterbore 62 and over the sealing member 112. The plug 108, 108A, 108B is secured to the slip yoke 22 by the lip 48 which is formed over the plug 108, 108A, 108B.

Figure 8:
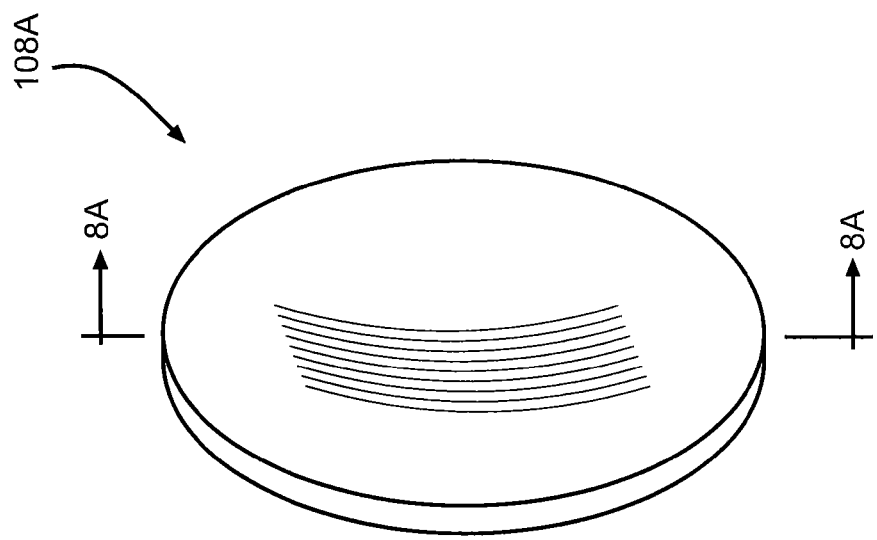
FIG. 8 is a perspective view of an embodiment of a plug suitable for use in the slip yoke assembly.
Figure 7:
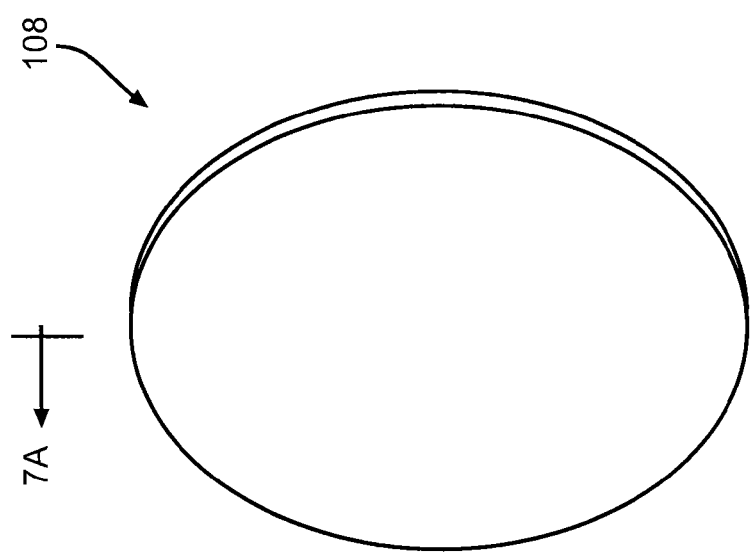
FIG. 7 is a perspective view of an embodiment of a plug suitable for use in the slip yoke assembly

Preferably, the plug 108, 108A, 108B is formed from a metallic material such as steel or copper. Embodiments of the plug 108, 108A, 108B which are suitable for use in the slip yoke assembly 20 are best shown in FIGS. 7-9, which will be utilized to illustrate and describe various features of these embodiments of the plug. It should be appreciated that the features illustrated and described for one embodiment of the plug can be utilized in the other embodiments shown in FIGS. 7-9. Additionally, it should be appreciated that in certain embodiments (not depicted), the slip yoke assembly 20 is not limited to the embodiments of the plug 108, 108A, 108B shown in FIGS. 7-9.

Preferably, the plug 108, 108A, 108B is of a welch type. The plug 108, 108A, 108B comprises the outer edge 106, a first surface 122 and a second surface 124. The first surface 122 and the second surface 124 each comprise an outer edge portion 126, 126A. Referring now to FIG. 3, the lip 48 is preferably formed over and about the outer edge portion 126A of the second surface 124. The seal surface 70 and the sealing member 112 contact the outer edge portion 126 of the first surface 122. The outer edge 106 of the plug 108, 108A, 108B faces and abuts the first wall 66 of the slip yoke 22. The outer edge 106 defines an outer diameter 128 of the plug 108, 108A, 108B. The outer diameter 128 is of a length which is greater than that of the major diameter 60 of the long bore 54.

In an embodiment, the plug 108, 108A, 108B is of a thickness which is equal or about equal to a thickness of the counterbore 62. Referring now to the embodiment illustrated in FIG. 7, the first surface 122 and second surface 124 of the plug 108, 108A, 108B may be provided in a parallel relationship with each other. However, the plug is not limited to having parallel first and second surfaces. For example, as shown in FIG. 8, the first surface 122 and second surface 124 may not be provided in a parallel relationship with each other. In this embodiment, the plug 108A may be dome-shaped. Additionally, as illustrated in FIG. 9, in an embodiment a chamfered surface 130 may be provided about the first surface 122 and between the outer edge 106 and the first surface 122. In this embodiment, the chamfered surface 130 is attached to the first surface 122 on an end and the outer edge 106 on an opposite end.

Figure 6:
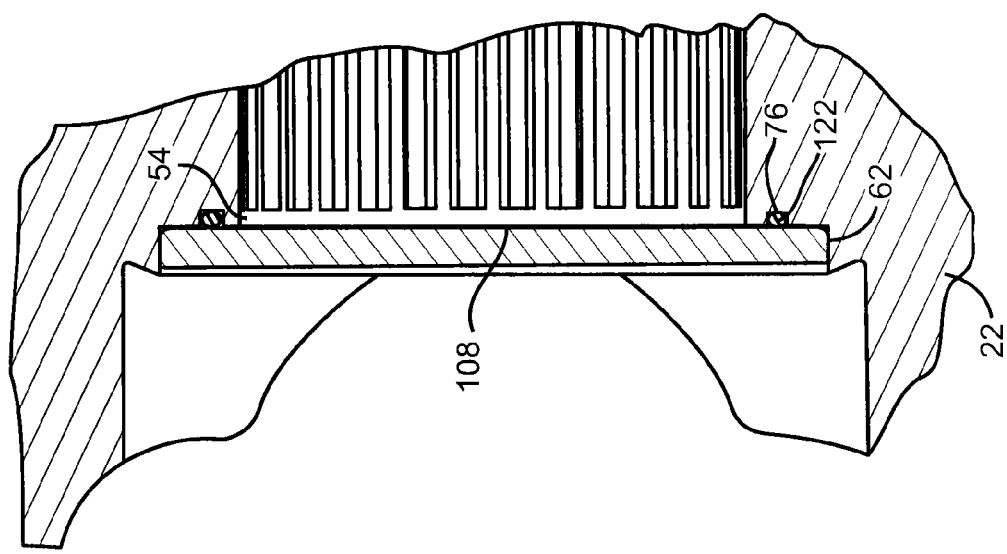
FIG. 6 is a cross-sectional view of portions of a slip yoke assembly in accordance with the invention taken prior to forming a lip of the slip yoke assembly.

Referring now to FIGS. 5 and 6, the slip yoke assembly 20 is formed by providing the slip yoke 22 and positioning the plug 108, 108A, 108B in the counterbore 62 and sealing member 112 in the annular groove 76. Disposed within the annular groove 76, the sealing member 112 is positioned between the first surface 122 of the plug 108, 108A, 108B and the end surface 84 of the annular groove 76. The sealing member 112 is secured to the slip yoke 22 by positioning the plug 108, 108A, 108B over the sealing member 112. During formation of the assembly 20, the sealing member 112 is compressed to have a thickness which is equal to a thickness of the walls 86, 88 of the annular groove 76 when the assembly 20 is formed.

Next, as shown in FIG. 3, the lip 48 is formed over the plug 108, 108A, 108B. Preferably, the lip 48 is contiguous and formed annularly about the outer edge portion 126A of the plug 108, 108A, 108B. Thus, when the slip yoke assembly 20 is formed, the sealing member 112 is disposed within the annular groove 76 and the plug 108, 108A, 108B is disposed within the first diameter 64 of the counterbore 62 and secured to the slip yoke 22 by the lip 48.

The foregoing description is considered as illustrative only of the principles of the invention. Further, since numerous modifications and changes will readily occur to those skilled in the art, it is not desired to limit the invention to the exact construction and assemblies shown and described herein. Accordingly, all suitable modifications and equivalents may be considered as falling within the scope of the invention as defined by the claims which follow.

What is claimed is:

1. A slip yoke assembly, comprising:
a slip yoke having a long bore which is splined and extends between a first end and a second end and a counterbore at the second end of the long bore, the counterbore having a first wall which defines a first diameter which is greater than a major diameter of the long bore;
an annular groove positioned between the long bore and the first wall;
a sealing member disposed within the annular groove; and
a plug disposed within the counterbore and over the sealing member wherein the plug is secured to the slip yoke by a lip formed over the plug and which is formed from a portion of the slip yoke.

2. The slip yoke assembly defined by claim 1, wherein the annular groove is radially positioned between the long bore and the first wall.

3. The slip yoke assembly defined by claim 1, wherein the lip is annular, contiguous and formed about an outer edge portion of the plug.

4. The slip yoke assembly defined by claim 1, wherein a fluid tight seal is provided at the end of the slip yoke.

5. The slip yoke assembly defined by claim 1, wherein the annular groove extends axially from an end surface to a seal surface of the slip yoke.

6. The slip yoke assembly defined by claim 1, wherein the plug is of a thickness which is equal or about equal to a thickness of the counterbore.

7. The slip yoke assembly defined by claim 1, wherein the sealing member is an O-ring.

8. The slip yoke assembly defined by claim 1, wherein the annular groove comprises an annular end surface provided between an axial extending outer wall and an axial extending inner wall.

9. The slip yoke assembly defined by claim 1, wherein the annular groove has a diameter which is greater than the major diameter of the long bore.

10. The slip yoke assembly defined by claim 9, wherein the outer wall and inner wall are of a thickness and the sealing member is of a thickness which is equal to the thickness of the outer wall and inner wall.

11. The slip yoke assembly defined by claim 9, wherein the diameter of the annular groove is less than the first diameter of the counterbore.

12. The slip yoke assembly defined by claim 1, wherein the plug is dome-shaped.

13. The slip yoke assembly defined by claim 1, wherein the plug comprises a first surface and a second surface which is in a parallel relationship with the first surface.

14. The slip yoke assembly defined by claim 1, wherein the sealing member comprises an inner diameter and an outer diameter.

15. The slip yoke assembly defined by claim 1, wherein the lip is formed by staking.

16. The slip yoke assembly defined by claim 1, wherein the annular groove is provided in a seal surface of the counterbore and is separated from the long bore and the first wall by radially extending portions of the seal surface.

17. The slip yoke assembly defined by claim 1, wherein the sealing member is compressed between a first surface of the plug and an end surface of the annular groove so that the sealing member is provided with a thickness which is equal to a thickness of the outer wall and inner wall.

18. The slip yoke assembly defined by claim 1, wherein a pair of opposed lug ears extend away from the second end of the long bore.

19. A slip yoke assembly, comprising:
a slip yoke having a long bore which is splined and extends between a first end and a second end and a counterbore at the second end of the long bore, the counterbore having a first wall which defines a first diameter which is greater than a major diameter of the long bore;
an annular groove provided in a seal surface of the slip yoke and positioned between the long bore and the first wall, the annular groove comprising an end surface, an axially extending inner wall and an axially extending outer wall wherein the axially extending inner wall and axially extending outer wall are each attached to portions of the seal surface;
a sealing member comprising an inner diameter and an outer diameter which is disposed within the annular groove over the end surface and between the axially extending inner wall and outer wall; and
a plug is disposed within the counterbore over the sealing member and secured to the slip yoke by a contiguous annular lip formed over an outer edge portion of the plug and which is formed from a portion of the slip yoke to provide a fluid tight seal at the second end of the slip yoke.

20. The slip yoke assembly defined by claim 19, wherein the sealing member is positioned between a first surface of the plug and the end surface of the annular groove so that the sealing member is provided with a thickness which is equal to a thickness of the outer wall and inner wall.

* * * * *